United States Patent
Qin et al.

(10) Patent No.: US 9,954,850 B2
(45) Date of Patent: Apr. 24, 2018

(54) SERVICE LOCKING METHOD, APPARATUSES AND SYSTEMS THEREOF

(71) Applicant: TENCENT TECHNOLOGY (SHENZHEN) COMPANY LIMITED, Shenzhen, Guangdong (CN)

(72) Inventors: Mingxue Qin, Shenzhen (CN); Xiao He, Shenzhen (CN); Lei Qin, Shenzhen (CN); Yuye Wang, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 160 days.

(21) Appl. No.: 14/945,613

(22) Filed: Nov. 19, 2015

(65) Prior Publication Data
US 2016/0072795 A1    Mar. 10, 2016

Related U.S. Application Data

(63) Continuation of application No. PCT/CN2014/077419, filed on May 14, 2014.

(30) Foreign Application Priority Data

May 29, 2013 (CN) .......................... 2013 1 0207476

(51) Int. Cl.
*G06F 7/04* (2006.01)
*G06F 17/30* (2006.01)
(Continued)

(52) U.S. Cl.
CPC ........ *H04L 63/0823* (2013.01); *H04L 9/3213* (2013.01); *H04L 9/3271* (2013.01);
(Continued)

(58) Field of Classification Search
CPC . H04L 63/08; H04L 63/10; H04L 9/32; H04L 9/3226; H04L 29/06; G06F 21/30;
(Continued)

(56) References Cited

U.S. PATENT DOCUMENTS

2004/0097271 A1* 5/2004 Aerrabotu ............. H04M 1/673
455/565
2010/0138535 A1* 6/2010 Jerrim ................... G06F 21/552
709/224
(Continued)

FOREIGN PATENT DOCUMENTS

| CN | 1818919 A | 8/2006 |
|---|---|---|
| CN | 101393666 A | 3/2009 |

(Continued)

OTHER PUBLICATIONS

International Search Report of PCT/CN2014/077419 dated Aug. 20, 2014.
(Continued)

*Primary Examiner* — Jayesh Jhaveri
(74) *Attorney, Agent, or Firm* — Sughrue Mion, PLLC

(57) ABSTRACT

Disclosed are a service locking method, apparatuses and systems thereof. The method includes: receiving a locking request including identification information of a designated service and an identifier of an operating terminal, the designated service being a service of performing a sensitive operation to network virtual property; and sending an authentication request containing the identification information of the designated service and the identifier of the operating terminal to an authentication server, and locking the designated service upon receiving successful authentication information from the authentication server. By locking the designated service in the operating terminal after the authentication server authenticates the operating terminal successfully, the problem that the network virtual property (Continued)

of a legal user is likely to undergo an unauthorized operation is solved; a designated service, once locked, may not be directly operated by any operating terminal, thereby preventing unauthorized operations on the designated service.

20 Claims, 8 Drawing Sheets

(51) Int. Cl.

| | | |
|---|---|---|
| *G06F 15/16* | (2006.01) | |
| *H04L 29/06* | (2006.01) | |
| *H04W 12/08* | (2009.01) | |
| *G06F 21/30* | (2013.01) | |
| *G06F 21/35* | (2013.01) | |
| *H04W 12/06* | (2009.01) | |
| *H04W 12/12* | (2009.01) | |
| *H04L 9/32* | (2006.01) | |
| *G06F 21/31* | (2013.01) | |

(52) U.S. Cl.
CPC ............ *H04L 63/08* (2013.01); *H04L 63/102* (2013.01); *G06F 21/30* (2013.01); *G06F 21/305* (2013.01); *G06F 21/31* (2013.01); *G06F 21/35* (2013.01); *H04L 9/32* (2013.01); *H04L 9/3226* (2013.01); *H04L 63/10* (2013.01); *H04W 12/06* (2013.01); *H04W 12/08* (2013.01); *H04W 12/12* (2013.01)

(58) Field of Classification Search
CPC ........ G06F 21/305; G06F 21/31; G06F 21/35; G06F 7/04; G06F 15/16; G06F 17/30; H04W 12/06; H04W 12/08; H04W 12/12
See application file for complete search history.

(56) References Cited

U.S. PATENT DOCUMENTS

| | | | | |
|---|---|---|---|---|
| 2011/0296069 A1* | 12/2011 | Tarta | ..................... | G06F 9/526 710/200 |
| 2012/0042396 A1* | 2/2012 | Guerra | .................... | G06F 21/88 726/30 |
| 2014/0283012 A1* | 9/2014 | Eggerton | ................ | G06F 21/31 726/19 |
| 2015/0039892 A1* | 2/2015 | Fujita | .................... | H04L 9/3226 713/171 |
| 2015/0082026 A1* | 3/2015 | Gupta | .................... | H04L 67/10 713/155 |
| 2015/0281950 A1* | 10/2015 | Carr | ........................ | H04W 4/02 455/411 |
| 2016/0277439 A1* | 9/2016 | Rotter | ................. | H04L 63/0861 |

FOREIGN PATENT DOCUMENTS

| | | |
|---|---|---|
| CN | 101499152 A | 8/2009 |
| CN | 101727705 A | 6/2010 |
| CN | 101789149 A | 7/2010 |
| CN | 101996446 A | 3/2011 |
| CN | 102790674 A | 11/2012 |
| CN | 102946381 A | 2/2013 |
| CN | 103023539 A | 4/2013 |
| WO | 2005/079050 A1 | 8/2005 |
| WO | 2013/063353 A1 | 5/2013 |

OTHER PUBLICATIONS

Communication dated Oct. 17, 2017 issued by the State Intellectual Property Office of People's Republic of China in counterpart application no. 201310207476.8 Concise Explanation of Relevance.

* cited by examiner

SERVICE LOCKING METHOD, APPARATUSES AND SYSTEMS THEREOF

CROSS-REFERENCE TO RELATED APPLICATION

This application is a continuation application of PCT Patent Application No. PCT/CN 2014/077419, filed on May 14, 2014, which is based upon and claims the benefit of priority from Chinese Patent Application No. 2013102074768, filed on May 29, 2013, the entire contents of which are incorporated herein by reference.

TECHNICAL FIELD

Embodiments of the present disclosure relate to the field of virtual property security, and particularly relate to a service locking method, apparatuses and systems thereof.

BACKGROUND

With continuous development of network technologies, the Internet provides more and more services for users, for example, Internet-based virtual payment, web browsing or network game currency payment, and the like. In general, a user certifies a service firstly to obtain an account and password corresponding to this service, and then the user may log in to or manage this service using this account and password.

At present, a service operating method is available. According to the method, a user inputs an account and password corresponding to a service to an operating terminal firstly, and then logs in to the service in cases where the account and password are correct; subsequently, the user may perform corresponding operations to the service upon logging in to the service, for example, virtual currency payment, shopping with funds in e-bank, modification of personal data and confidential information, and the like.

During the implementation of the embodiments of the present disclosure, the inventors find that the related art has at least the following problems: Once logging in to a service correctly, a user may perform any operation to the service; however, during the process of logging in to the service, it is likely for an unauthorized user to steal the account and password of the service and execute some unauthorized operations by using the stolen account and password, for example, shopping with the virtual currency corresponding to this account, and the like. Therefore, the network virtual property of an authorized user is likely subject to an unauthorized operation in the existing service operating method.

SUMMARY

Accordingly, embodiments of the present disclosure provide a service locking method, apparatuses and systems thereof. The technical solutions are described as follows:

In a first aspect, a service locking method is provided, applied to a locking server, including:

receiving a locking request including identification information of a designated service and an identifier of an operating terminal, the designated service being a service of performing a sensitive operation to network virtual property;

sending an authentication request containing the identification information of the designated service and the identifier of the operating terminal to an authentication server, such that the authentication server determines authentication information according to the identification information of the designated service and the identifier of the operating terminal as well as the identification information of the designated service and identifier of the trusted terminal that are bound upon receiving the authentication request, and sends the authentication information to the locking server;

receiving the authentication information from the authentication server; and locking the designated service if the authentication information indicates successful authentication.

In a second aspect, a service authentication method is provided, applied to an authentication server, including:

receiving an authentication request sent after a locking server receives a locking request or an unlocking request, the authentication request containing identification information of a designated service and an identifier of an operating terminal, the designated service being a service of performing a sensitive operation to network virtual property;

determining authentication information according to the identification information of the designated service and the identifier of the operating terminal as well as the identification information of the designated service and identifier of the trusted terminal that are bound upon receiving the authentication request; and sending the authentication information to the locking server, such that the locking server receives the authentication information from the authentication server and locks or unlocks the designated service if the authentication information indicates successful authentication.

In a third aspect, a locking server is provided, including: one or more processors; and a memory; where the memory stores one or more programs configured to be executed by the one or more processors, the one or more programs containing instructions for performing the following operations:

receiving a locking request including identification information of a designated service and an identifier of an operating terminal, the designated service being a service of performing a sensitive operation to network virtual property;

sending an authentication request containing identification information of the designated service and the identifier of the operating terminal to an authentication server, such that the authentication server determines authentication information according to the identification information of the designated service and the identifier of the operating terminal as well as the identification information of the designated service and identifier of the trusted terminal that are bound upon receiving the authentication request, sending the authentication information to the locking server;

receiving the authentication information from the authentication server; and locking the designated service if the authentication information indicates successful authentication.

In a fourth aspect, an authentication server is provided, including: one or more processor; and a memory; where the memory stores one or more programs configured to be executed by the one or more processors, the one or more programs containing instructions for performing the following operations:

receiving an authentication request sent after a locking server receives a locking request or an unlocking request, the authentication request containing identification information of a designated service and an identifier of an operating terminal, the designated service being a service of performing a sensitive operation to network virtual property;

determining authentication information according to the identification information of the designated service and the identifier of the operating terminal as well as the identification information of the designated service and identifier of the trusted terminal that are bound upon receiving the authentication request; and sending the authentication information to the locking server, such that the locking server receives the authentication information from the authentication server and locks or unlocks the designated service if the authentication information indicates successful authentication.

The technical solutions according to the embodiments of the present disclosure achieve the following beneficial effects:

By receiving a locking request including identification information of a designated service and an identifier of an operating terminal, the designated service being a service of performing a sensitive operation to network virtual property, sending an authentication request containing the identification information of the designated service and the identifier of the operating terminal to an authentication server, and locking the designated service if the authentication information indicates successful authentication, the problem that the network virtual property of a legal user is likely to undergo an unauthorized operation in the service operating method provided in the background art is solved; a designated service, once locked, may not be directly operated by any operating terminal; and thus an unauthorized operation to the designated service is avoided.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art may derive other accompanying drawings based on these accompanying drawings without any creative efforts.

DETAILED DESCRIPTION

To make the objects, technical solutions and advantages of the present disclosure clearer, the implementation of the present disclosure is further described as below in details with reference to the accompanying drawings.

Figure 1:
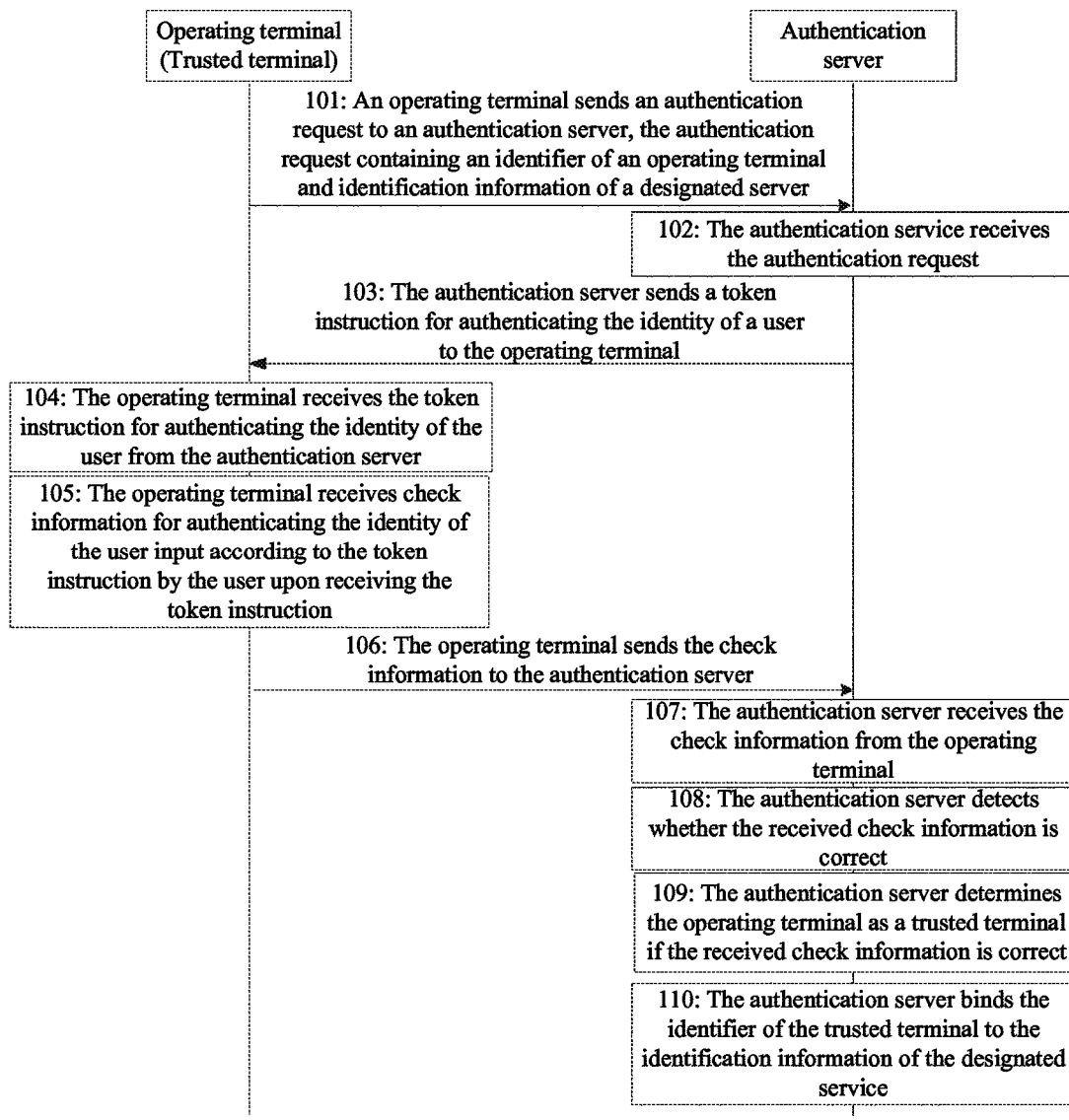
FIG. 1 is a flowchart of a service binding method according to an embodiment of the present disclosure.

Referring to FIG. 1, a flowchart of a service certification method according to an embodiment of the present disclosure is illustrated. This embodiment is illustrated as an example where the service certification method is collaborative implemented by an operating terminal and an authentication server. The service certification method may include the following steps:

Step 101: An operating terminal sends a certification request to an authentication server, the certification request containing an identifier of the operating terminal and identification information of a designated server.

The operating terminal here refers to a terminal provided for a user to perform related operations, for example, a mobile phone, a personnel computer, a multimedia TV set, a multifunctional camera or an e-reader, and the like.

In practice, a user may download and install, in the operating terminal, an application interface or plug-in that corresponds to a designated service and is provided by a server corresponding to the designated service. Such application interface or pug-in has a unique identifier. As a user usually uses a handheld operating terminal during the identity certification, when an application interface or plug-in with a unique identifier has been downloaded and installed in the operating terminal, the user identity certification for a designated service may be performed using the application interface or plug-in. In this case, if the certification is successful, higher security is usually achieved. In general, as the user identity certification is performed only once, the possibility for an unauthorized user to steal the unique identifier is quite low.

A designated service here is a service of performing a sensitive operation to network virtual property. The sensitive operation to network virtual property may be spending or shopping with the network virtual property, and the like. For example, such designated services may usually include an online payment operation, a game currency use operation, and the like.

Step 102: The authentication service receives the certification request.

Correspondingly, the authentication server receives the certification request from the operating terminal, the certification request containing an identifier of an operating terminal and identification information of a designated service.

Step 103: The authentication server sends a token instruction for certifying the identity of a user to the operating terminal.

Upon receiving the certification request, the authentication server determines a designated service according to the identification information of the designated service, and determines an operating terminal according to the identifier of the operating terminal.

Usually, the designated service is a service registered by a user. When registering the service, the user enters registration information related to the user himself according to the requirements of a server corresponding to the service, for example, the ID number, mobile phone number, e-mail address, contact address or graduate college of the user, and the like. That is, upon receiving the certification request, the authentication server pulls, according to the identification information of the designated information, the registration information related to the designated service from a server corresponding to the designated service.

With regard to the registration information, the authentication server generates a token instruction for certifying the identity of the user. For example, if the registration information contains the ID number of the user, the authentication server may generate a token instruction, for example, "Please enter ID number", with regard to the ID number. For another example, if the registration information contains the e-mail address of the user, the authentication server may generate a token instruction, for example, "Please enter e-mail address", with regard to the e-mail address.

Obviously, the token instruction here may contain more than one kind of content. For example, the token instruction may include a token instruction generated with regard to the ID number of the user, another token instruction generated with regard to the e-mail address of the user, or yet another token instruction generated with regard to the mobile phone number of the user. Then, the authentication server may send the token instruction simultaneously containing all the above information to the operating terminal.

Step 104: The operating terminal receives the token instruction for certifying the identity of the user from the authentication server.

The token instruction herein may be an identity card number, a real name, a mobile phone number or other information of the user. After the operating terminal receives the token instruction, the user may input corresponding check information on the operation terminal according to the detailed information of the token instruction. For example, when the token instruction is: "please input mobile phone number of the user", the check information input by the user with respect to the token instruction may be "13911110000".

Step 105: The operating terminal receives check information for certifying the identity of the user input according to the token instruction by the user upon receiving the token instruction.

Upon receiving the token instruction, the operating terminal displays the token instruction on the screen of the operating terminal, such that the user inputs corresponding information according to the token instruction. For example, when the user is required by the token instruction to input his ID number, the user may input own ID number in a corresponding input box. For another example, when the user is required by the token instruction to input his e-mail address, the user may input the e-main address related to the designated service in a corresponding input box.

Here, information, which is input by a user and can be used for certifying the identity of the user, is referred to as check information.

Step 106: The operating terminal sends the check information to the authentication server.

In a preferred embodiment, to ensure the security, the operating terminal may encrypt the check information according to a preset encryption way first, and then send the encrypted check information to the authentication server. The encryption way here may be pre-negotiated by the operating terminal and the authentication server.

Step 107: The authentication server receives the check information from the operating terminal.

Step 108: The authentication server detects whether the received check information is correct.

The authentication server detects whether the received check information is identical to the pre-stored registration information corresponding to the token instruction. If the received check information is identical to the pre-stored registration information corresponding to the token instruction, the received check information is correct.

Step 109: The authentication server determines the operating terminal as a trusted terminal if the received check information is correct.

That is, when a user is able to complete the user identity certification in an operating terminal, i.e., when the check information received by the authentication server is correct during the user identity certification, the authentication server may determine the operating terminal as a trusted terminal.

Step 110: The authentication server binds the identifier of the trusted terminal to the identification information of the designated service.

The authentication server binds the identifier of the determined trusted terminal to the identification information of the designated service. Apparently, for a same designated service, there may be a plurality of trusted terminals. That is, the user may perform the user identity certification in a plurality of operating terminals, and perform the user identity certification in the plurality of operating terminals successfully. In this case, all these operating terminals, in which the user identity certification is performed successfully, may be regarded as trusted terminals, and then these trusted terminals are bound with the identification information of a corresponding designated service, respectively.

In addition, when an operating terminal never experiences the user identity authentication, or fails to pass the user identity authentication, the authentication server will not bind the identifier of the operating terminal to the identification information of the designated service.

It should be noted that, step 101 and step 104 to step 106 may be implemented separately to form a service certification method using a trusted terminal as an execution subject, while step 102, step 103, and step 107 to step 110 may be implemented separately to form a service certification method using an authentication server as an execution subject.

Figure 2:
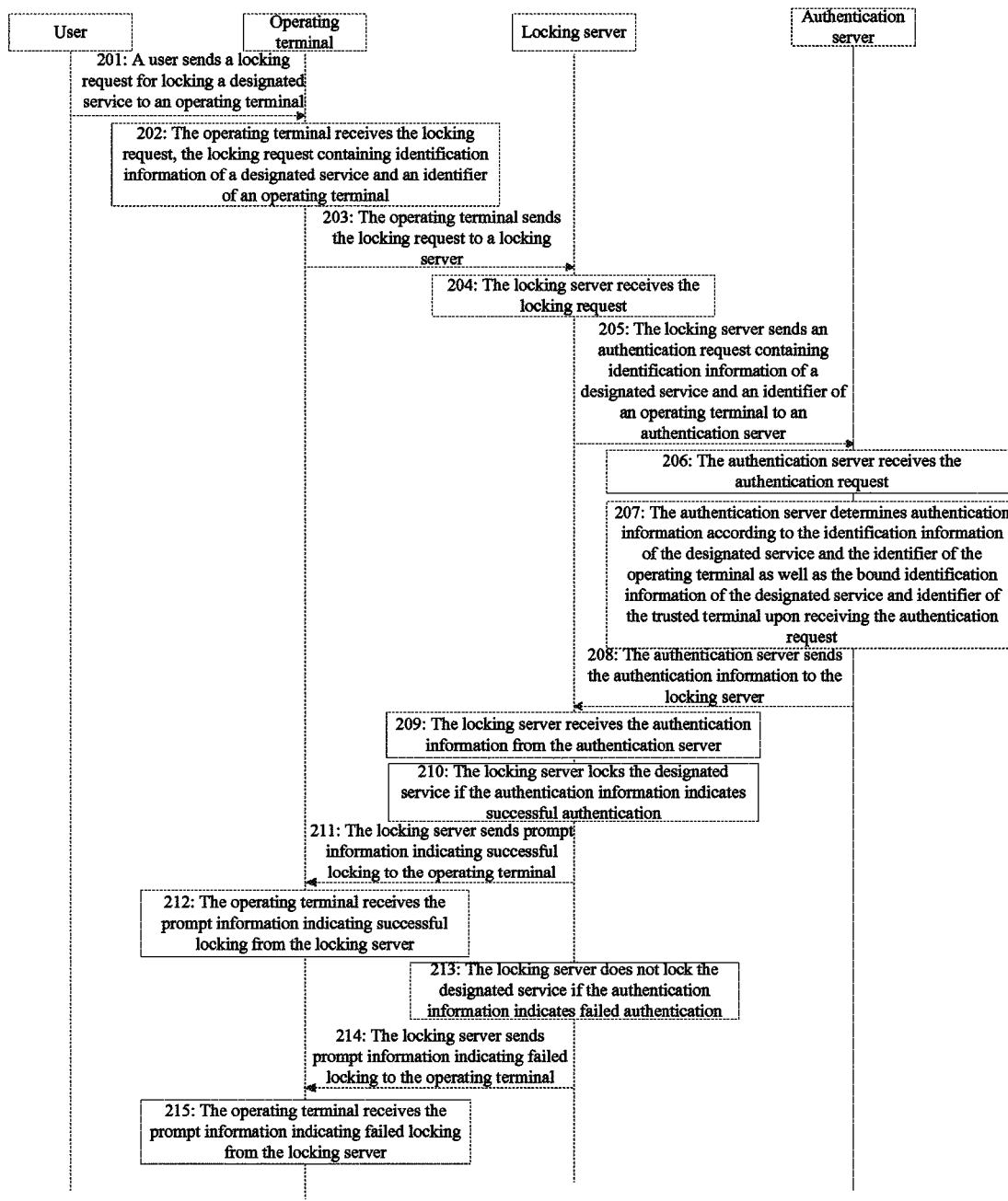
FIG. 2 is a flowchart of a service locking method according to another embodiment of the present disclosure.

Referring to FIG. 2, a flowchart of a service locking method according to another embodiment of the present disclosure is illustrated. This embodiment is illustrated as an example where the service locking method is collaborative implemented by an operating terminal, a locking server and an authentication server. The service locking method may include the following steps:

Step 201: A user sends a locking request for locking a designated service to an operating terminal.

A designated service here is a service of performing a sensitive operation to network virtual property. The sensitive operation to network virtual property may be spending with the network virtual property. For example, such designated services may usually include an online payment operation, a game currency use operation, and the like. The user can prevent the disclosure of important information contained in these services by locking these designated services.

It should be noted that the operating terminal here may be a trusted terminal in which the identity certification has been performed to the user, for example, an operating terminal in which the user identity certification has been completed according to the embodiment as illustrated in FIG. 1, or an ordinary operating terminal in which no user identity certification is performed or the user identity certification is failed.

Step 202: The operating terminal receives the locking request, the locking request containing identification information of a designated service and an identifier of an operating terminal.

After the user requests the operating terminal to lock a designated service, the operating terminal correspondingly receives a locking request generated as the user requests for locking the designated service.

Step 203: The operating terminal sends the locking request to a locking server.

Correspondingly, after the user selects to lock a designated service, the operating terminal may send the locking request for locking the designated service to the locking server. To be convenient for the locking server to know that which designated service is sent by which operating terminal according to the locking request, the locking request usually contains identification information of a designated service and an identifier of an operating terminal.

Step 204: The locking server receives the locking request.

After the operating terminal sends the locking request to the locking server, correspondingly, the locking server may receive the locking request. Apparently, the received locking request contains identification information of a designated service and an identifier of an operating terminal.

In a preferred embodiment, upon receiving the locking request, the locking server may also detect whether the current state of the designated service is a LOCKED state according to the identification information of the designated service. If the current state of the designated service is not LOCKED, the process proceeds to step 205.

Step 205: The locking server sends an authentication request containing identification information of a designated service and an identifier of an operating terminal to an authentication server.

To determine whether the operating terminal and the user are legal, the locking server usually sends an authentication request for authenticating whether a designated service and an operating terminal are legal to the authentication server upon receiving the locking request. The authentication request usually contains identification information of a designated service and an identifier of an operating terminal.

Step 206: The authentication server receives the authentication request.

After the locking server sends the authentication request to the authentication server, correspondingly, the authentication server receives the authentication request from the locking server. The authentication request correspondingly contains identification information of a designated service and an identifier of an operating terminal.

Step 207: The authentication server determines authentication information according to the identification information of the designated service and the identifier of the operating terminal as well as a relationship between the identification information of the designated service and identifier of the trusted terminal that are bound upon receiving the authentication request.

Usually, the identification information of the designated service and identifier of the trusted terminal that are bound described here refers to the identification information of the designated service and identifier of the trusted terminal that are bound after the user identity certification is successful.

The process of the authentication server obtaining the identification information of the designated service and identifier of the trusted terminal that are bound may refer to the related descriptions in the embodiment as illustrated in FIG. 1.

In a preferred embodiment, this step may include the following steps:

The authentication server detects whether the identification information of the designated service and the identifier of the operating terminal are identical to a group of the identification information of the designated service and the identifier of the trusted terminal that are bound;

The authentication server determines that the authentication information indicates successful authentication if the identification information of the designated service and the identifier of the operating terminal are identical to the group of the identification information of the designated service and the identifier of the trusted terminal that are bound.

That is, when the identification information of the designated service and the identifier of the operating terminal are identical to the group of the identification information of the designated service and the identifier of the trusted terminal that are bound, it is determined that the user has performed user identity certification to the designated service using the operating terminal.

The authentication server determines that the authentication information indicates failed authentication if the identification information of the designated service and the identifier of the operating terminal are not identical to the group of the identification information of the designated service and the identifier of the trusted terminal that are bound.

That is, when the identification information of the designated service and the identifier of the operating terminal are not identical to the group of the identification information of the designated service and the identifier of the trusted terminal that are bound, it is determined that the user has not performed user identity certification to the designated service using the operating terminal.

Step 208: The authentication server sends the authentication information to the locking server.

In the case of successful authentication, the authentication server sends the authentication information indicating successful authentication to the locking server; while in the case of failed authentication, the authentication server sends the authentication information indicating failed authentication to the locking server.

Step 209: The locking server receives the authentication information from the authentication server.

Correspondingly, the locking server receives the authentication information indicating successful authentication or the authentication information indicating failed authentication from the authentication server.

Step 210: The locking server locks the designated service if the authentication information indicates successful authentication.

If the authentication information received by the locking server indicates successful authentication, the designated service is locked. That is, when the authentication information received by the locking server indicates successful authentication, it is indicated that the operating terminal is a trusted terminal, such that the operating terminal has the right to lock the designated service.

Correspondingly, if the authentication information received by the locking server indicates failed authentication, it is indicated that the operating terminal may not be a terminal used by a legal user. In this case, to protect the important information of the legal user, the designated service is not locked.

In a preferred embodiment, the locking server sets the current state of the designated service as a LOCKED state, such that other operating terminals send a state inquiry request to the locking server to inquire whether the designated service is locked when the user operates the designated service in other operating terminals; and correspondingly, the locking server may directly feed back the current state of the designated service to other operating terminals.

Step 211: The locking server sends prompt information indicating successful locking to the operating terminal.

It can be seen that the designated service may be locked successfully when the operating terminal can lock is a trusted terminal.

Step 212: The operating terminal receives the prompt information indicating successful locking from the locking server.

Usually, upon receiving the prompt information indicating successful locking from the locking server, the operating terminal correspondingly displays prompt information related to successful locking on the display screen of the operating terminal.

Step 213: The locking server does not lock the designated service if the authentication information indicates failed authentication.

If the authentication information received by the locking server from the authentication server indicates failed authentication, the locking server does not lock the designated service. That is, when the authentication information received by the locking server from the authentication server indicates failed authentication, the operating terminal is not a trusted terminal of the designated service. Consequently, the operating terminal has no right to lock the designated service.

Step 214: The locking server sends prompt information indicating failed locking to the operating terminal.

Step 215: The operating terminal receives the prompt information indicating failed locking from the locking server.

If the locking server sends prompt information indicating failed locking to the operating terminal, the operating terminal receives the prompt information indicating failed locking from the locking server.

It can be seen that the designated service usually may not be locked successfully when the operating terminal is not a trusted terminal of the designated service. For instance, when a user has performed user identity certification to a designated service in an operating terminal A and the certification is successful, the user may lock the designated service in the operating terminal A and the locking is usually successful; and if the user has not performed user identity certification to the designated service in an operating terminal B or the certification in the operating terminal B is failed, for example, an unauthorized user performs user identity certification in the operating terminal B and the user identity certification is failed as the unauthorized user does not know the answer designated by a token sent from the authentication server clearly, the unauthorized user is unable to lock the designated service in the operating terminal B.

It should be noted that, step 202, step 203, step 212 and step 215 may be implemented separately to form a service locking method using an operating terminal as an execution subject, step 204, step 205, step 209 to step 211, step 213 and step 214 may be implemented separately to form a service locking method using a locking server as an execution subject, and Step 206 to Step 208 may be implemented separately to form a service authentication method using an authentication server as an execution subject.

It should be noted that, with respect to a scenario where a service is locked, an embodiment of the present invention provides a method for unlocking the service.

Figure 3:
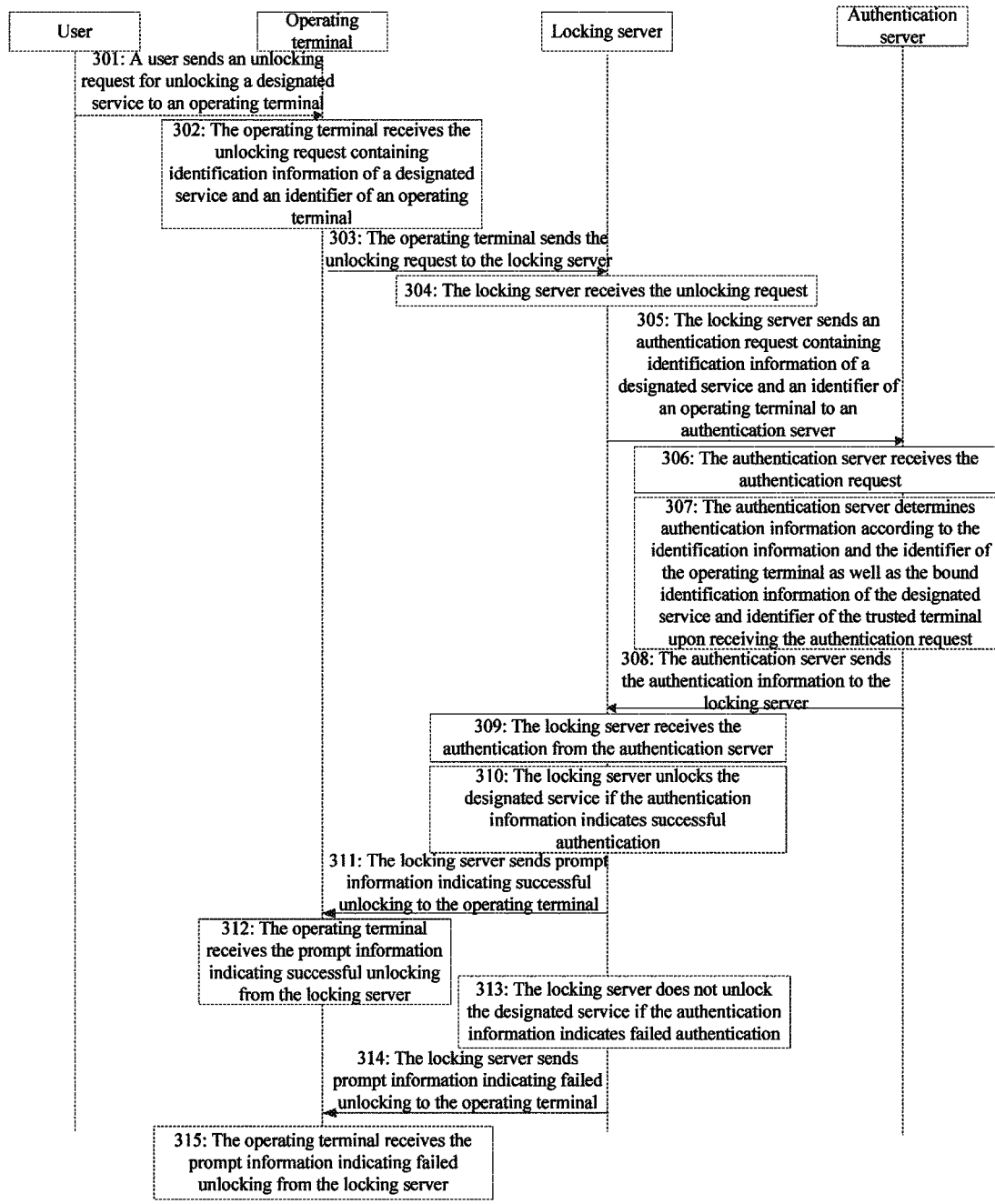
FIG. 3 is a flowchart of a service unlocking method according to an embodiment of the present disclosure.

Referring to FIG. 3, a flowchart of a service unlocking method according to an embodiment of the present disclosure is illustrated. The service unlocking method may be implemented by an operating terminal, a locking server and an authentication server in collaboration. The service unlocking method may include the following steps:

Step 301: A user sends an unlocking request for unlocking a designated service to an operating terminal.

A designated service usually involves network virtual property. For example, such designated services may usually include an online payment operation from the account of a user, a game currency use operation, and other operations carried with property information of the user.

Usually, the user may select to unlock a locked designated service in the operating terminal, such that related operations can be performed using the designated service unlocked.

The operating terminal here may be a trusted terminal or an ordinary operating terminal. For example, when a user has performed user identity certification to the designated service in an operating terminal and the user identity certification is successful, the terminal is regarded as a trusted terminal; and correspondingly, when a user has not performed user identity certification to the designated service in another operating terminal or the user identity certification is failed, the terminal is just an ordinary operating terminal or called a non-trusted terminal.

Step 302: The operating terminal receives the unlocking request containing identification information of a designated service and an identifier of an operating terminal.

A designated service here is a service of performing a sensitive operation to network virtual property. The sensitive operation to network virtual property may be spending with the network virtual property. For example, such designated services may usually include an online payment operation, a game currency use operation, and the like.

After the user requests the operating terminal to unlock a designated service, the operating terminal correspondingly receives an unlocking request generated as the user requests for unlocking the designated service.

Step 303: The operating terminal sends the unlocking request to the locking server.

Correspondingly, after the user selects to unlock a designated service, the operating terminal may send the unlocking request for unlocking the designated service to the locking server. To be convenient for the locking server to know that which designated service is sent by which operating terminal according to the unlocking request, the unlocking request usually contains identification information of a designated service and an identifier of an operating terminal.

Step 304: The locking server receives the unlocking request.

After the operating terminal sends the unlocking request to the locking server, correspondingly, the locking server may receive the unlocking request. Apparently, the received unlocking request contains the identification information of a designated service and an identifier of an operating terminal.

In a preferred embodiment, upon receiving the unlocking request, the locking server may also detect whether the current state of the designated service is a LOCKED state according to the identification information of the designated service. If the current of the designated service is a LOCKED state, the process proceeds to step 305.

Step 305: The locking server sends an authentication request containing identification information of a designated service and an identifier of an operating terminal to an authentication server.

To determine whether the operating terminal and the user are legal in order to prevent unauthorized users from unlocking the designated service in other operating terminals, the locking server usually sends an authentication request for authenticating whether the designated service and the operating terminal are legal to the authentication server upon receiving the unlocking request. The authentication request usually contains identification information of a designated service and an identifier of an operating terminal.

Step 306: The authentication server receives the authentication request.

After the locking server sends the authentication request to the authentication sever, correspondingly, the authentication server receives the authentication request from the locking server. The authentication request correspondingly contains identification information of a designated service and an identifier of an operating terminal.

Step 307: The authentication server determines authentication information according to the identification information and the identifier of the operating terminal as well as a relationship between the identification information of the designated service and identifier of the trusted terminal that are bound upon receiving the authentication request.

Usually, the identification information of the designated service and identifier of the trusted terminal which are bound here refers to the identification information of the designated service and identifier of the trusted terminal that are bound after the user identity certification is successful.

The process of the authentication server obtaining the identification information of the designated service and identifier of the trusted terminal that are bound may refer to the related descriptions in the embodiment as illustrated in FIG. 1.

In a preferred embodiment, this step may include the following steps:

The authentication server detects whether the identification information of the designated service and the identifier of the operating terminal are identical to a group of the identification information of the designated service and the identifier of the trusted terminal that are bound.

The authentication server determines that the authentication information indicates successful authentication if the identification information of the designated service and the identifier of the operating terminal are identical to the group of the identification information of the designated service and the identifier of the trusted terminal that are bound.

The authentication server determines that the authentication information indicates failed authentication if the identification information of the designated service and the identifier of the operating terminal are not identical to the group of the identification information of the designated service and the identifier of the trusted terminal that are bound.

Step 308: The authentication server sends the authentication information to the locking server.

In the case of successful authentication, the authentication server sends the authentication information indicating successful authentication to the locking server; while in the case of failed authentication, the authentication server sends the authentication information indicating failed authentication to the locking server.

Step 309: The locking server receives the authentication from the authentication server.

Correspondingly, the locking server receives the authentication information indicating successful authentication or the authentication information indicating failed authentication from the authentication server.

Step 310: The locking server unlocks the designated service if the authentication information indicates successful authentication.

If the authentication information received by the locking server indicates successful authentication, the designated service is unlocked.

In a preferred embodiment, the locking server sets the current state of the designated service as an UNLOCKED state, such that other operating terminals send a state inquiry request to the locking server to inquire whether the designated service is locked when the user operates the designated service in other operating terminals; and correspondingly, the locking server may directly feed the current state of the designated service to other operating terminals.

Step 311: The locking server sends prompt information indicating successful unlocking to the operating terminal.

Step 312: The operating terminal receives the prompt information indicating successful unlocking from the locking server.

Usually, upon receiving the prompt information indicating successful unlocking from the locking server, the operating terminal correspondingly displays prompt information related to successful unlocking on the display screen of the operating terminal.

It can be seen that, when the prompt information indicates successful unlocking, it is indicated that the operating terminal is a trusted terminal, thus the designated service may be unlocked.

Step 313: The locking server does not unlock the designated service if the authentication information indicates failed authentication.

Correspondingly, if the authentication information received by the locking server indicates failed authentication, it is indicated that the operating terminal may not a terminal used by a legal user. In this case, to protect the important information of a legal user, the designated service is not unlocked.

Step 314: The locking server sends prompt information indicating failed unlocking to the operating terminal.

Corresponding, if the authentication information received by the locking server indicates failed authentication, the locking server sends prompt information indicating failed unlocking to the operating terminal.

Step 315: The operating terminal receives the prompt information indicating failed unlocking from the locking server.

Correspondingly, if the locking server sends prompt information indicating failed unlocking to the operating terminal, the operating terminal receives the prompt information indicating failed unlocking from the locking server.

It can be seen that the operating terminal is not a trusted terminal of the designated service and the designated service may not be unlocked when the prompt information indicates failed unlocking. That is, if a user has performed user identity certification to a designated service in an operating terminal A and the certification is successful, the operating terminal A is regarded as a trusted terminal. In this case, other than the trusted terminal, the designated service may not be unlocked by other operating terminals. In this way, the possibility for an unauthorized user to successfully unlock the designated service in other operating terminals is avoided.

It should be noted that, step 302, step 303, step 312 and step 315 may be implemented separately to form a service unlocking method using an operating terminal as an execution subject, step 304, step 305, step 309 to step 311, step 313 and step 314 may be implemented separately to form a service unlocking method using a locking server as an execution subject, and step 306 to step 308 may be implemented separately to form a service authentication method using an authentication server as an execution subject.

In conclusion, the service locking method and the service unlocking method provided by the above embodiments solve the security problem occurring when a designated service is locked and unlocked, such that the designated service can be locked or unlocked successfully by a trusted terminal only, but may not be locked or unlocked successfully by other operating terminals, thus locking or unlocking the designated service successfully by an unauthorized user in other operating terminals may be avoided.

Figure 4:
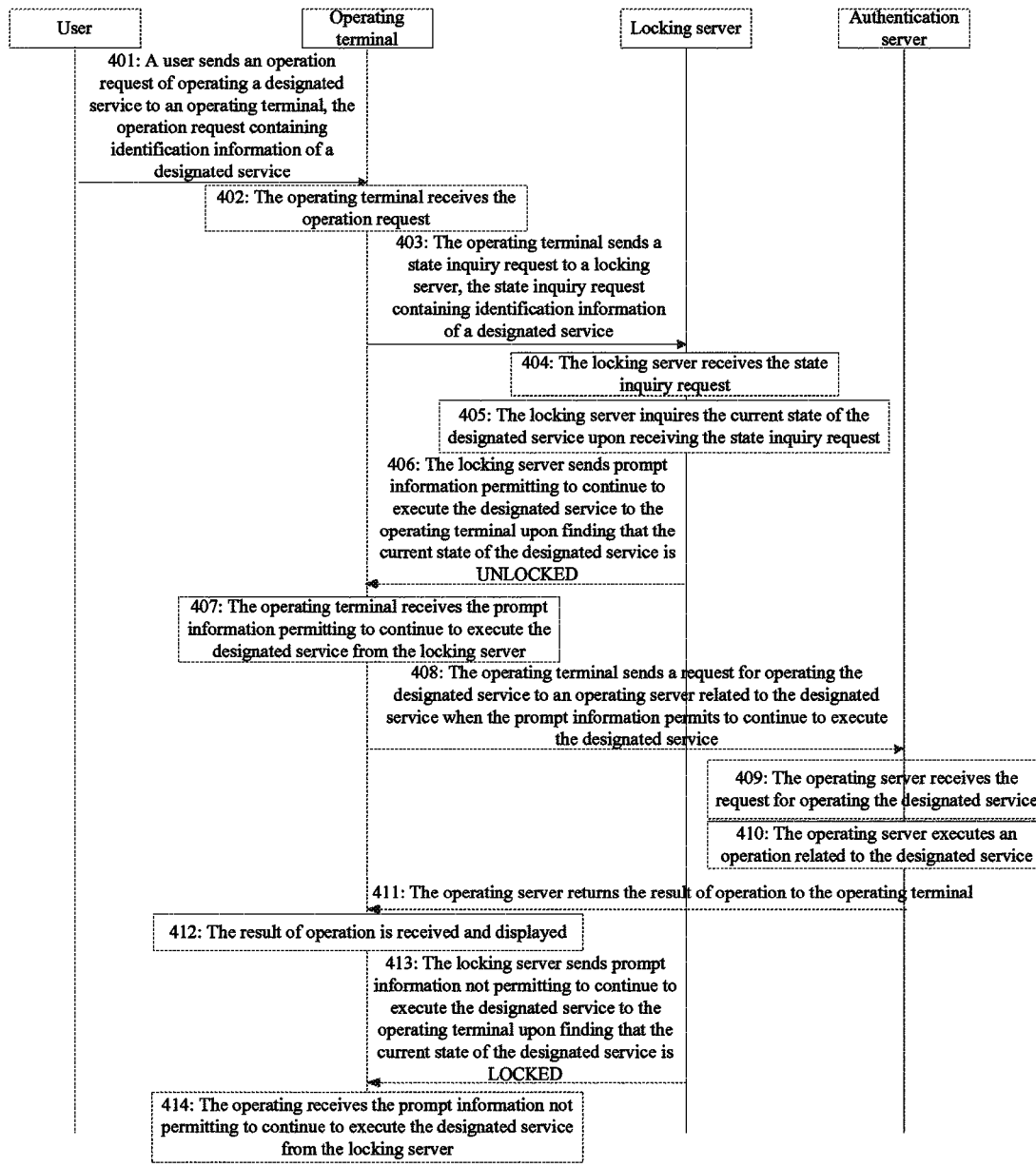
FIG. 4 is a flowchart of a method for performing operations to a designated service according to another embodiment of the present disclosure.

Referring to FIG. 4, a flowchart of a method for operating a designated service according to another embodiment of the present disclosure is illustrated. The method for operating a designated service may include the following steps:

Step 401: A user sends an operation request of operating a designated service to an operating terminal, the operation request containing identification information of a designated service.

A designated service here is a service of performing a sensitive operation to network virtual property. The sensitive operation to network virtual property may be spending with the network virtual property. For example, such designated services may usually include an online payment operation, a game currency use operation, and the like.

Step 402: The operating terminal receives the operation request.

Step 403: The operating terminal sends a state inquiry request to a locking server, the state inquiry request containing identification information of a designated service.

Step 404: The locking server receives the state inquiry request.

Step 405: The locking server inquires the current state of the designated service upon receiving the state inquiry request.

The current state of a designated service may be a LOCKED state indicating that the designated service has been locked or an UNLOCKED state indicating that the designated service has been unlocked.

Step 406: The locking server sends prompt information permitting to continue to execute the designated service to the operating terminal upon finding that the current state of the designated service is an UNLOCKED state.

Step 407: The operating terminal receives the prompt information permitting to continue to execute the designated service from the locking server.

Step 408: The operating terminal sends a request for operating the designated service to an operating server related to the designated service when the prompt information permits to continue to execute the designated service.

Step 409: The operating server receives the request for operating the designated service.

Step 410: The operating server executes an operation related to the designated service.

Step 411: The operating server returns the result of operation to the operating terminal.

Step 412: The result of operation is received and displayed.

That is, the operating terminal may operate the designated service in the case that the designated service is unlocked.

Step 413: The locking server sends prompt information not permitting to continue to execute the designated service to the operating terminal upon finding that the current state of the designated service is a LOCKED state.

Step 414: The operating receives the prompt information not permitting to continue to execute the designated service from the locking server.

That is, the operating terminal is not permitted to operate the designated service in the case that the designated service is in a LOCKED state.

Figure 5:
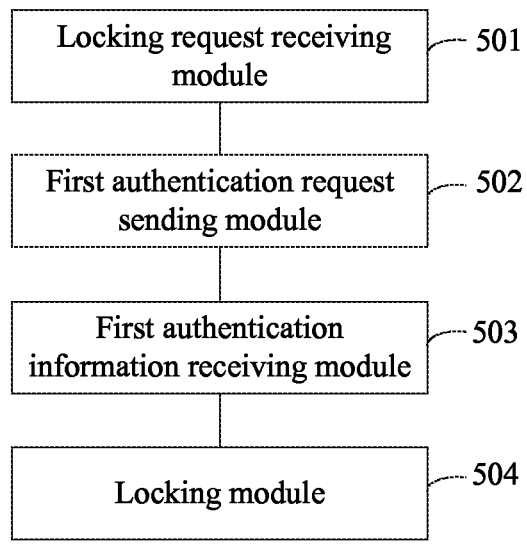
FIG. 5 is a schematic structural diagram of a service locking apparatus according to an embodiment of the present disclosure.

Referring to FIG. 5, a schematic structural diagram of a service locking apparatus according to an embodiment of the present disclosure is illustrated. The service locking apparatus may be a locking server or a part of the locking server. The service locking apparatus may include, but is not limited to, a locking request receiving module 501, a first authentication request sending module 502, a first authentication information receiving module 503, and a locking module 504.

The locking request receiving module 501 may be configured to receive a locking request including identification information of a designated service and an identifier of an operating terminal.

A designated service here is a service of performing a sensitive operation to network virtual property. The sensitive operation to network virtual property may be spending with the network virtual property. For example, such designated services may usually include an online payment operation, a game currency use operation, and the like.

The first authentication request sending module 502 may be configured to: send an authentication request containing identification information of a designated service, mentioned in the locking request received by the locking request receiving module 501, and an identifier of an operating terminal to an authentication server, such that the authentication server determines authentication information according to the identification information of the designated service and the identifier of the operating terminal as well as the identification information of the designated service and identifier of the trusted terminal that are bound upon receiving the authentication request; and send the authentication information to a locking server;

The first authentication information receiving module 503 may be configured to receive the authentication information from the authentication server.

The locking module 504 may be configured to lock the designated service when the authentication information received by the first authentication information receiving module 503 indicates successful authentication.

In a preferred embodiment, the locking server may further include a first detection module and a first trigger module.

The first detection module may be configured to detect whether the current state of the designated service is LOCKED according to the identification information of the designated service.

The first trigger module may be configured to trigger the first authentication request sending module 502 to send an authentication request containing identification information of a designated service and an identifier of an operating terminal to the authentication server when the first detection module detects that the current state of the designated service is not LOCKED.

In a preferred embodiment, the locking server may further include a first setup module and a first sending module.

The first setup module may be configured to set the current state of the designated service as LOCKED.

The first sending module may be configured to send prompt information indicating successful locking to the operating terminal.

In a preferred embodiment, the locking server may further include a second sending module.

The second sending module may be configured to send prompt information indicating failed locking to the operating terminal when the authentication information received by the first authentication information receiving module indicates failed authentication.

Figure 6:
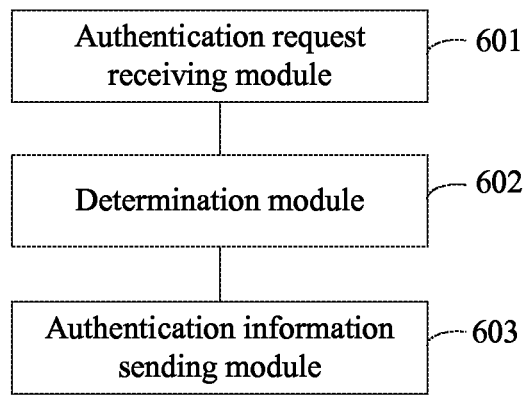
FIG. 6 is a schematic structural diagram of a service authentication apparatus according to another embodiment of the present disclosure.

Referring to FIG. 6, a schematic structural diagram of a service authentication apparatus according to an embodiment of the present disclosure is illustrated. The service authentication apparatus may be an authentication server or a part of the authentication server. The service authentication apparatus may include, but is not limited to, an authentication request receiving module 601, a determination module 602, and an authentication information sending module 603.

The authentication request receiving module 601 may be configured to receive an authentication request containing identification information of a designated service and an identifier of an operating terminal.

A designated service here is a service of performing a sensitive operation to network virtual property. The sensitive operation to network virtual property may be spending with the network virtual property. For example, such designated services may usually include an online payment operation, a game currency use operation, and the like.

The determination module 602 may be configured to determine authentication information according to the identification information of the designated service and the identifier of the operating terminal as well as the identification information of the designated service and identifier of the trusted terminal that are bound after the authentication request receiving module 601 receives the authentication request.

The authentication information sending module 603 may be configured to send the authentication information determined by the determination module 602 to the locking server.

In a preferred embodiment, the authentication server may further include an certification request receiving module, a token instruction sending module, a check information receiving module, a second detection module, an authentication module, and a binding module.

The certification request receiving module may be configured to receive an certification request containing an identifier of an operating terminal and identification information of a designated service.

The token instruction sending module may be configured to: send a token instruction for certifying the identity of a user to the operating terminal mentioned in the certification request received by the certification request receiving module, such that the operating terminal receives the token instruction, receives check information for certifying the identity of the user input according to the token instruction by the user upon receiving the token instruction; and send the check information to the authentication server.

The check information receiving module may be configured to receive the check information from the operating terminal.

The second detection module may be configured to detect whether the received check information is correct.

The authentication module may be configured to authenticate the operating terminal as a trusted terminal when the second detection module detects that the received check information is correct.

The binding module may be configured to bind the identifier of the trusted terminal to the identification information of the designated service.

In a preferred embodiment, the second detection module may be further configured to detect whether the check information received by the check information receiving module is identical to the pre-stored data information corresponding to the token instruction.

In a preferred embodiment, the determination module may further include a detection unit, a first determination unit, and a second determination unit.

The detection unit may be configured to detect whether the identification information of the designated service and the identifier of the operating terminal are identical to a group of the identification information of the designated service and the identifier of the trusted terminal that are bound.

The first determination unit may be configured to determine that the authentication information indicates successful authentication when the detection unit detects that the identification information of the designated service and the identifier of the operating terminal are identical to the group of the identification information of the designated service and the identifier of the trusted terminal that are bound.

The second determination unit may be configured to determine that the authentication information indicates failed authentication when the detection unit detects that the identification information of the designated service and the identifier of the operating terminal are not identical to the group of the identification information of the designated service and the identifier of the trusted terminal that are bound.

Figure 7:
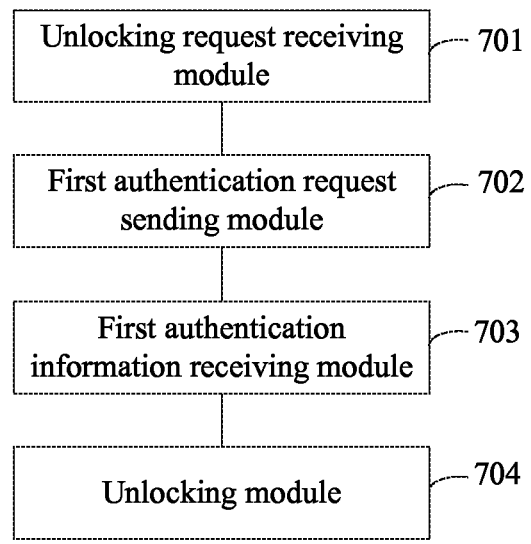
FIG. 7 is a schematic structural diagram of a service unlocking apparatus according to another embodiment of the present disclosure.

Referring to FIG. 7, a schematic structural diagram of a service unlocking apparatus according to an embodiment of the present disclosure is illustrated. The service unlocking apparatus may be a locking server or a part of the locking server. The service unlocking apparatus may include, but is not limited to, an unlocking request receiving module 701, a first authentication request sending module 702, a second authentication information receiving module 703, and an unlocking module 704.

The unlocking request receiving module 701 may be configured to receive an unlocking request containing identification information of a designated service and an identifier of an operating terminal.

A designated service here is a service of performing a sensitive operation to network virtual property. The sensitive operation to network virtual property may be spending or shopping with the network virtual property, and the like. For example, such designated services may usually include an online payment operation, a game currency use operation, and the like.

The second authentication request sending module 702 may be configured to: send an authentication request containing the identification information of the designated service and the identifier of the operating terminal received by the unlocking request receiving module 701 to an authentication server, such that the authentication server determines authentication information according to the identification information of the designated service and the identifier of the operating terminal as well as the identification information of the designated service and identifier of the trusted terminal that are bound upon receiving the authentication request; and send the authentication information to the locking server.

The second authentication information receiving module 703 may be configured to receive the authentication information from the authentication server.

The unlocking module 704 may be configured to unlock the designated service if the authentication information received by the second authentication information receiving module 703 indicates successful authentication.

In a preferred embodiment, the locking server may further include a third detection module and a second trigger module.

The third detection module may be configured to detect whether the current state of the designated service is LOCKED according to the identification information of the designated service mentioned in the unlocking request received by the unlocking request receiving module.

The second trigger module may be configured to trigger the authentication request sending module to send an authentication request containing the identification information of the designated service and the identifier of the operating terminal to the authentication server when the third detection module detects that the current state of the designated service is LOCKED.

In a preferred embodiment, the locking server may further include a second setup module and a third sending module.

The second setup module may be configured to set the current state of the designated service as LOCKED.

The third sending module may be configured to send prompt information indicating successful unlocking to the operating terminal.

In a preferred embodiment, the locking server may further include a fourth sending module.

The fourth sending module may be configured to send prompt information indicating failed unlocking to the operating terminal when the authentication information received by the second authentication information receiving module 703 indicates failed authentication.

Figure 8:
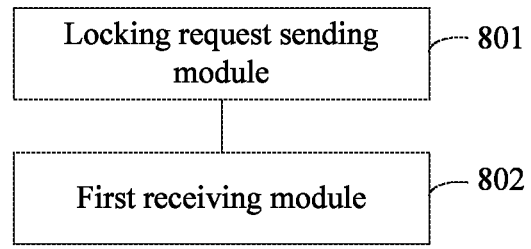
FIG. 8 is a schematic structural diagram of a service locking apparatus according to another embodiment of the present disclosure.

Referring to FIG. 8, a schematic structural diagram of a service locking apparatus according to an embodiment of the present disclosure is illustrated. The service locking apparatus may be an operating terminal or a part of the operating terminal. The service locking apparatus may include, but is not limited to, a locking request sending module 801 and a first receiving module 802.

The locking request sending module 801 may be configured to:

send a locking request to a locking server, the locking request including identification information of a designated service and an identifier of an operating terminal, the designated service being a service of performing a sensitive operation to network virtual property;

such that the locking server receives the locking request, and sends an authentication request containing identification information of the designated service and the identifier of the operating terminal to an authentication server;

such that the authentication server determines authentication information according to the identification information of the designated service and the identifier of the operating terminal as well as the identification information of the designated service and identifier of the trusted terminal that are bound upon receiving the authentication request, and sends the authentication information to the locking server;

such that the locking server receives receive the authentication information from the authentication server; lock the designated service if the authentication information indicates successful authentication; send prompt information indicating successful locking to the operation terminal if the authentication information indicates successful authentication; and send prompt information indicating failed locking to the operation terminal if the authentication information indicates failed authentication.

The first receiving module 802 may be configured to receive the prompt information indicating successful locking or the prompt information indicating failed locking from the locking server.

Figure 9:
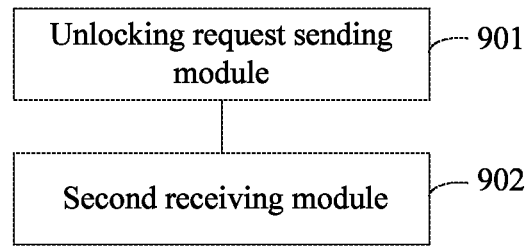
FIG. 9 is a schematic structural diagram of a service unlocking apparatus according to another embodiment of the present disclosure.

Referring to FIG. 9, a schematic structural diagram of a service unlocking apparatus according to an embodiment of the present disclosure is illustrated. The service unlocking apparatus may be an operating terminal or a part of the operating terminal. The service unlocking apparatus may include, but is not limited to, an unlocking request sending module 901 and a second receiving module 902.

The unlocking request sending module 901 may be configured to:

send an unlocking request to a locking server, the unlocking request containing identification information of a designated service and an identifier of an operating terminal, the designated service being a service of performing a sensitive operation to network virtual property;

such that the locking server receives the unlocking request, send an authentication request containing identification information of the designated service and the identifier of the operating terminal to an authentication server;

such that the authentication server determines authentication information according to the identification information of the designated service and the identifier of the operating terminal as well as the identification information of the designated service and identifier of the trusted terminal that are bound upon receiving the authentication request, and sends the authentication information to the locking server;

such that the locking server receive the authentication information from the authentication server; unlock the designated service if the authentication information indicates successful authentication; send prompt information indicating successful unlocking to the operation terminal if the authentication information indicates successful authentication; and send prompt information indicating failed unlocking to the operation terminal if the authentication information indicates failed authentication.

The second receiving module 902 may be configured to receive the prompt information indicating successful unlocking or the prompt information indicating failed unlocking from the locking server.

Figure 10:
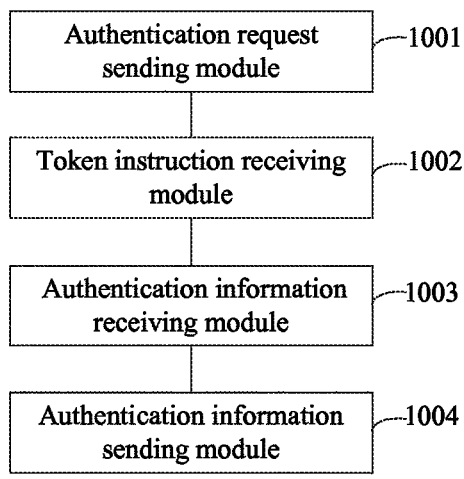
FIG. 10 is a schematic structural diagram of a service certification apparatus according to another embodiment of the present disclosure.

Referring to FIG. 10, a schematic structural diagram of a service certification apparatus according to an embodiment of the present disclosure is illustrated. The service certification apparatus may be an authentication server or a part of the authentication server. The service certification apparatus may include, but is not limited to, an certification request sending module 1001, a token instruction receiving module 1002, a check information receiving module 1003, and a check information sending module 1004.

The certification request sending module 1001 may be configured to send an certification request containing an identifier of an operating terminal and identification information of a designated service, the designated service being a service of performing a sensitive operation to network virtual property, such that the authentication server receives the certification request; and send a token instruction for certifying the identity of a user to the operating terminal.

The token instruction receiving module 1002 may be configured to receive the token instruction for certifying the identity of a user from the authentication server.

The check information receiving module 1003 may be configured to receive check information for certifying the identity of the user input according to the token instruction by the user after the token instruction receiving module 1002 receives the token instruction.

The check information sending module 1004 may be configured to: send the check information received by the check information receiving module 1003 to the authentication server, such that the authentication server receives the check information from the operating terminal, detects whether the received check information is correct, and binds the identifier of the operating terminal to the identification information of the designated service if the received check information is correct.

Figure 11:
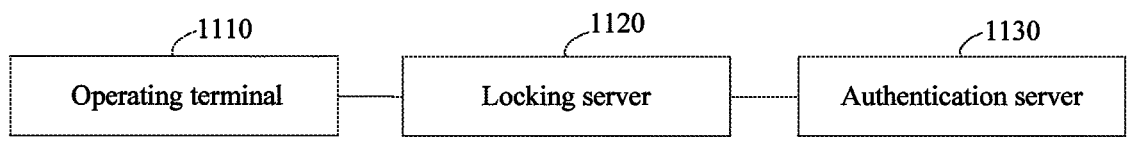
FIG. 11 is a schematic diagram of a service locking system according to an embodiment of the present disclosure.

Referring to FIG. 11, a schematic diagram of a service locking system according an embodiment of the present disclosure is illustrated. The service locking system includes a locking server 1120, an authentication server 1130, and at least one operating terminal 1110. The locking server 1120 and the authentication server 1130, the authentication server 1130 and the operating terminal 1110, and the authentication server 1130 and the operating 1110 are connected over a wired network or wireless network.

The operating terminal 1110 includes the service locking apparatus provided in the embodiment as illustrated in FIG. 8 and the preferred embodiments based on the embodiment as illustrated in FIG. 8.

The locking server 1120 includes the service locking apparatus provided in the embodiment as illustrated in FIG. 5 and the preferred embodiments based on the embodiment as illustrated in FIG. 5.

The authentication server 1130 includes the service authentication apparatus provided in the embodiment as illustrated in FIG. 6 and the preferred embodiments based on the embodiment as illustrated in FIG. 6.

Still referring to FIG. 11, a schematic diagram of a service unlocking system according to an embodiment of the present disclosure is illustrated. The service unlocking system may include a locking server 1120, an authentication server 1130 and at least one operating terminal 1110. The locking server 1120 and the authentication server 1130, the authentication server 1130 and the operating terminal 1110, and the authentication server 1130 and the operating 1110 are connected over a wired network or wireless network.

The operating terminal 1110 includes the service unlocking apparatus provided in the embodiment as illustrated in FIG. 9 and the preferred embodiments based on the embodiment as illustrated in FIG. 9.

The locking server 1120 includes the service unlocking apparatus provided in the embodiment as illustrated in FIG. 7 and the preferred embodiments based on the embodiment as illustrated in FIG. 7.

Figure 12:
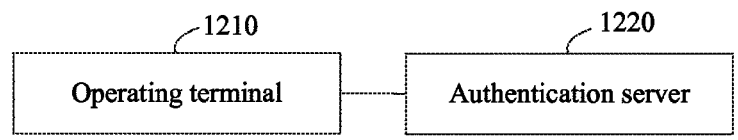
FIG. 12 is a schematic diagram of a service certification system according to an embodiment of the present disclosure.

The authentication server 1130 includes the service authentication apparatus provided in the embodiment as illustrated in FIG. 6 and the preferred embodiments based on the embodiment as illustrated in FIG. 6. Referring to FIG. 12, a schematic diagram of a service certification system according to an embodiment of the present disclosure is illustrated. The service certification system may include an authentication server 1210 and an operating terminal 1210, which are connected over a wired network or wireless network.

The operating terminal 1210 includes the service certification apparatus provided in the embodiment as illustrated in FIG. 10 and the preferred embodiments based on the embodiment as illustrated in FIG. 10.

The authentication server 1220 includes the service authentication apparatus provided in the embodiment as illustrated in FIG. 6 and the preferred embodiments based on the embodiment as illustrated in FIG. 6.

It should be noted that, the operating terminal, the locking server and the authentication server provided by the above embodiments are illustrated through the division of the above all functional modules by way of example when locking or unlocking a designated service. However, in practices, the above functions may be implemented by different functional modules according to actual requirements. That is, the internal structures of the terminal or server may be divided into different functional modules for completing all or part of the functions described above. In addition, the operating terminal, the locking server and the authentication server provided by the above embodiments and the embodiments of the corresponding service unlocking method, service locking method and service authentication method are based on the same idea. The specific implementation process is disclosed in the embodiments of the methods and is not repeated here.

Figure 13:
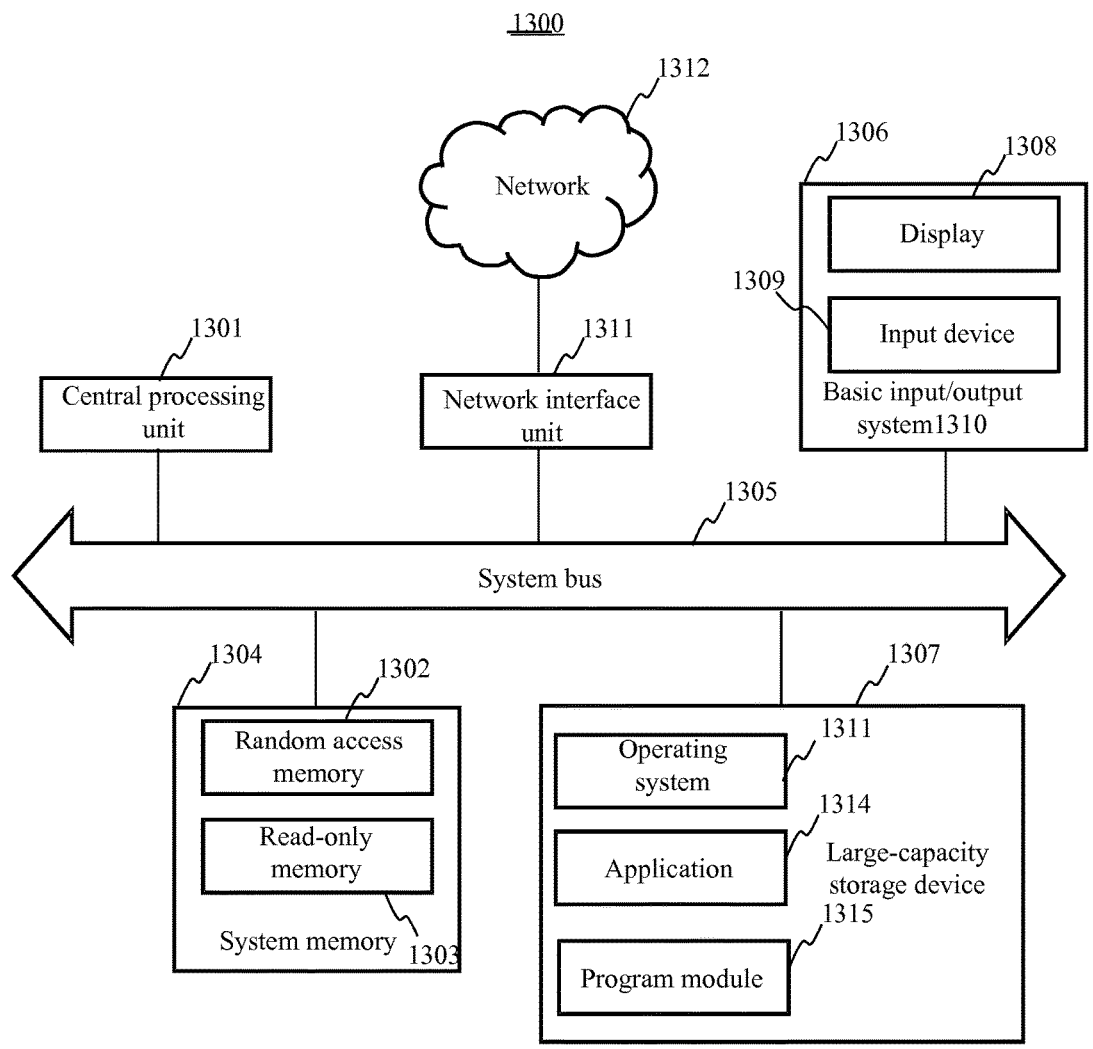
FIG. 13 is a schematic diagram of a locking server or an authentication server according to an embodiment of the present disclosure.

Referring to FIG. 13, a structure diagram of a locking server or an authentication server according to an embodiment of the present disclosure is illustrated. The locking server or authentication server 1300 includes a central processing unit (CPU) 1301, a system memory 1304 including a random access memory (RAM) 1302 and a read-only memory (ROM) 1303, and a system bus 1305 connecting the system memory 1304 with the central processing unit 1301. The locking server or authentication server 1300 further includes a basic input/output system (I/O system) 1306 for assisting each device in a computer to transmit information, and a mass storage device 1307 for storing operating systems 1313, applications 1314 and other program modules 1315.

The basic input/output system 1306 includes a display 1308 for displaying information and an input device 1309 provided for a user to input information, such as a mouse or keyboard. The display 1308 and the input device 1309 are connected to the central processing unit 1301 using an input/output controller 1310 that is connected to the system bus 1305. The basic input/output system 1306 may further include an input/output controller 1310 for receiving and processing the input from a keyboard, a mouse, an electronic stylus or multiple other devices. Similarly, the input/output controller 1310 is also provided with an output device outputting to a display and a printer or other types of output devices.

The mass storage device 1307 is connected to the central processing unit 1301 using a mass storage controller (not illustrated) that is connected to the system bus 1305. The mass storage device 1307 and the associated computer readable medium thereof provide nonvolatile storage for the locking server or authentication server 1300. In other words, the mass storage device 1307 may include a computer readable medium (not illustrated), such as a hard disk or a compact disc-read only memory (CD-ROM) drive.

Typically, the computer readable medium may include a computer memory medium and a communication medium. The computer storage medium includes volatile and non-volatile, movable and unmovable media that are implemented using any method and technology for storing information such as computer-readable instructions, data structures, program modules, or other data. The non-transitory computer-readable medium includes a RAM, a ROM, an EPROM, an EEPROM, a flash memory, or another such solid storage technology-based storage device; a CD-ROM, a DVD, or another such optical storage device; and a data cartridge, a magnetic card, a magnetic tape, or another such magnetic storage device. Nevertheless, persons of ordinary skill in the art should understand that the computer storage medium is not limited thereto. The above system memory 1304 and the mass storage device 1307 may be uniformly referred to as a memory.

According to various embodiments of the present disclosure, the locking server or authentication server 1300 may be also connected to a remote computer on the network for running over a network, such as Internet. That is, the server 1300 may be connected to a network 1312 using a network interface unit 1311 connected to the system bus 1305, or connected to other types of networks or remote computer systems (not illustrated) using the network interface unit 1311.

The memory further includes one or more programs. The one or more programs are stored in the memory, and contain instructions for performing the service locking method and/or service unlocking method provided by the embodiments of the present disclosure.

The sequence numbers of the preceding embodiments of the present invention are only for ease of description, but do not denote the preference of the embodiments.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a ROM, a magnetic disk, or a CD-ROM.

The foregoing descriptions are merely preferred embodiments of the present disclosure, and are not intended to limit the present disclosure. Any modification, equivalent replacement and improvement made within the spirit and principle of the present disclosure shall fall into the protection scope of the present disclosure.

What is claimed is:

1. A service locking method, applied to a locking server, comprising:
receiving by the locking server, a locking request from a user, the locking request containing identification information of a designated service to be locked and an identifier of an operating terminal, the designated service being a service of performing a sensitive operation to network virtual property;
sending from the locking server, an authentication request containing the identification information of the designated service and the identifier of the operating terminal to an authentication server, such that the authentication server determines authentication information according to the identification information of the designated service and the identifier of the operating terminal as well as a relationship between the identification information of the designated service and identifier of a trusted terminal that are bound upon receiving the authentication request, and sends the authentication information to the locking server;
receiving, at the locking server, the authentication information from the authentication server; and
locking, by the locking server, the designated service if the authentication information indicates successful authentication.

2. The method according to claim 1, wherein after the receiving a locking request, the method further comprises:
detecting whether current state of the designated service is a LOCKED state according to the identification information of the designated service; and
performing the step of sending the authentication request containing the identification information of the designated service and the identifier of the operating terminal to the authentication server if the current state of the designated service is not the LOCKED state.

3. The method according to claim 1, wherein after the locking the designated service, the method further comprises:
setting current state of the designated service as a LOCKED state; and
sending prompt information indicating successful locking to the operating terminal.

4. The method according to claim 1, wherein after the locking the designated service, the method further comprises:
receiving an unlocking request, the unlocking request containing the identification information of the designated service and the identifier of the operating terminal, the designated service being a service of performing a sensitive operation to network virtual property;
sending an authentication request containing the identification information of the designated service and the identifier of the operating terminal to the authentication server, such that the authentication server determines authentication information according to the identification information of the designated service and the identifier of the operating terminal, as well as a relationship between the identification information of the designated service and identifier of the trusted terminal that are bound upon receiving the authentication request, and sends the authentication information to the locking server;
receiving the authentication information from the authentication server; and
unlocking the designated service if the authentication information indicates successful authentication.

5. The method according to claim 4, wherein after the receiving an unlocking request, the method further comprises:
detecting whether current state of the designated service is a LOCKED state according to the identification information of the designated service; and
performing the step of sending the authentication request containing the identification information of the designated service and the identifier of the operating terminal to the authentication server if the current state of the designated service is the LOCKED state.

6. The method according to claim 4, wherein after the unlocking the designated service, the method further comprises:
setting current state of the designated service as a UNLOCKED state; and
sending prompt information indicating successful unlocking to the operating terminal.

7. A service authentication method, applied to an authentication server, comprising:
receiving from a locking server, an authentication request sent after the locking server receives a locking request or an unlocking request from a user, the authentication request containing identification information of a designated service to be locked and an identifier of an operating terminal, the designated service being a service of performing a sensitive operation to network virtual property;

determining authentication information according to the identification information of the designated service and the identifier of the operating terminal as well as a relationship between the identification information of the designated service and identifier of a trusted terminal that are bound upon receiving the authentication request; and sending the authentication information to the locking server, such that the locking server receives the authentication information from the authentication server, and locks or unlocks the designated service if the authentication information indicates successful authentication.

8. The method according to claim 7, prior to the receiving the authentication request, the method further comprises:

receiving a certification request, the certification request containing an identifier of an operating terminal and identification information of a designated service;

sending a token instruction for certifying the identity of a user to the operating terminal, such that the operating terminal receives the token instruction and receives check information for certifying the identity of the user, which is input according to the token instruction by the user, upon receiving the token instruction, and sends the check information to the authentication server;

receiving the check information from the operating terminal;

detecting whether the received check information is correct;

determining the operating terminal as a trusted terminal if the received check information is correct; and binding the identifier of the trusted terminal to the identification information of the designated service.

9. The method according to claim 8, wherein the detecting whether the received check information is correct comprises:

detecting whether the received check information is identical to the pre-stored data information corresponding to the token instruction.

10. The method according to claim 7, wherein the determining authentication information according to the identification information of the designated service and the identifier of the operating terminal as well as the relationship between the identification information of the designated service and identifier of the trusted terminal that are bound comprises:

detecting whether the identification information of the designated service and the identifier of the operating terminal are identical to a group of the identification information of the designated service and the identifier of the trusted terminal that are bound;

determining that the authentication information indicates successful authentication if the identification information of the designated service and the identifier of the operating terminal are identical to the group of the identification information of the designated service and the identifier of the trusted terminal that are bound; and determining that the authentication information indicates failed authentication if the identification information of the designated service and the identifier of the operating terminal are not identical to the group of the identification information of the designated service and the identifier of the trusted terminal that are bound.

11. A locking server, comprising:
one or more processors; and
a memory;

wherein the memory stores one or more programs configured to be executed by the one or more processors, the one or more programs comprising instructions for performing the following operations:

receiving at the locking server, a locking request from a user, the locking request containing identification information of a designated service to be locked and an identifier of an operating terminal, the designated service being a service of performing a sensitive operation to network virtual property;

sending from the locking server, an authentication request containing identification information of the designated service and the identifier of the operating terminal to an authentication server, such that the authentication server determines authentication information according to the identification information of the designated service and the identifier of the operating terminal as well as a relationship between the identification information of the designated service and identifier of a trusted terminal that are bound upon receiving the authentication request, and sends the authentication information to the locking server;

receiving, at the locking server, the authentication information from the authentication server; and locking, by the locking server, the designated service if the authentication information indicates successful authentication.

12. The locking server according to claim 11, wherein the one more programs further comprise instructions for performing the following operations:

detecting whether current state of the designated service is a LOCKED state according to the identification information of the designated service; and performing the step of sending the authentication request containing the identification information of the designated service and the identifier of the operating terminal to the authentication server if the current state of the designated service is not the LOCKED state.

13. The locking server according to claim 11, wherein the one more programs further comprise instructions for performing the following operations:

setting current state of the designated service as a LOCKED state; and sending prompt information indicating successful locking to the operating terminal.

14. The locking server according to claim 11, wherein the one more programs further comprise instructions for performing the following operations:

receiving an unlocking request, the unlocking request containing the identification information of the designated service and the identifier of the operating terminal, the designated service being a service of performing a sensitive operation to network virtual property;

sending an authentication request containing the identification information of the designated service and the identifier of the operating terminal to the authentication server, such that the authentication server determines authentication information according to the identification information of the designated service and the identifier of the operating terminal as well as a relationship between the identification information of the designated service and identifier of the trusted terminal that are bound upon receiving the authentication request, and sends the authentication information to the locking server;

receiving the authentication information from the authentication server; and unlocking the designated service if the authentication information indicates successful authentication.

15. The locking server according to claim 14, wherein the one more programs further comprise instructions for performing the following operations:
   detecting whether current state of the designated service is a LOCKED state according to the identification information of the designated service; and
   performing the step of sending the authentication request containing the identification information of the designated service and the identifier of the operating terminal to the authentication server if the current state of the designated service is the LOCKED state.

16. The locking server according to claim 14, wherein the one more programs further comprise instructions for performing the following operations:
   setting current state of the designated service as a UNLOCKED state; and
   sending prompt information indicating successful unlocking to the operating terminal.

17. An authentication server, comprising:
   one or more processor; and
   a memory;
   wherein the memory stores one or more programs configured to be executed by the one or more processors, the one or more programs containing instructions for performing the following operations:
   receiving, from a locking server, an authentication request sent after the locking server receives a locking request or an unlocking request from a user, the authentication request containing identification information of a designated service to be locked and an identifier of an operating terminal, the designated service being a service of performing a sensitive operation to network virtual property;
   determining authentication information according to the identification information of the designated service and the identifier of the operating terminal as well as a relationship between the identification information of the designated service and identifier of a trusted terminal that are bound upon receiving the authentication request; and
   sending the authentication information to the locking server, such that the locking server receives the authentication information from the authentication server, and locks or unlocks the designated service if the authentication information indicates successful authentication.

18. The authentication server according to claim 17, wherein the one more programs further comprise instructions for performing the following operations:
   receiving a certification request, the certification request containing an identifier of an operating terminal and identification information of a designated service;
   sending a token instruction for certifying the identity of a user to the operating terminal, such that the operating terminal receives the token instruction and receives check information for certifying the identity of the user, which is input according to the token instruction by the user, upon receiving the token instruction, and sends the check information to the authentication server;
   receiving the check information from the operating terminal;
   detecting whether the received check information is correct;
   determining the operating terminal as a trusted terminal if the received check information is correct; and
   binding the identifier of the trusted terminal to the identification information of the designated service.

19. The authentication server according to claim 18, wherein the one more programs further comprise an instruction for performing the following operation:
   detecting whether the received check information is identical to the pre-stored data information corresponding to the token instruction.

20. The authentication server according to claim 17, wherein the one more programs further comprise instructions for performing the following operations:
   detecting whether the identification information of the designated service and the identifier of the operating terminal are identical to a group of the identification information of the designated service and the identifier of the trusted terminal that are bound;
   determining that the authentication information indicates successful authentication if the identification information of the designated service and the identifier of the operating terminal are identical to the group of the identification information of the designated service and the identifier of the trusted terminal that are bound; and
   determining that the authentication information indicates failed authentication if the identification information of the designated service and the identifier of the operating terminal are not identical to the group of the identification information of the designated service and the identifier of the trusted terminal that are bound.

* * * * *